Figure 3:
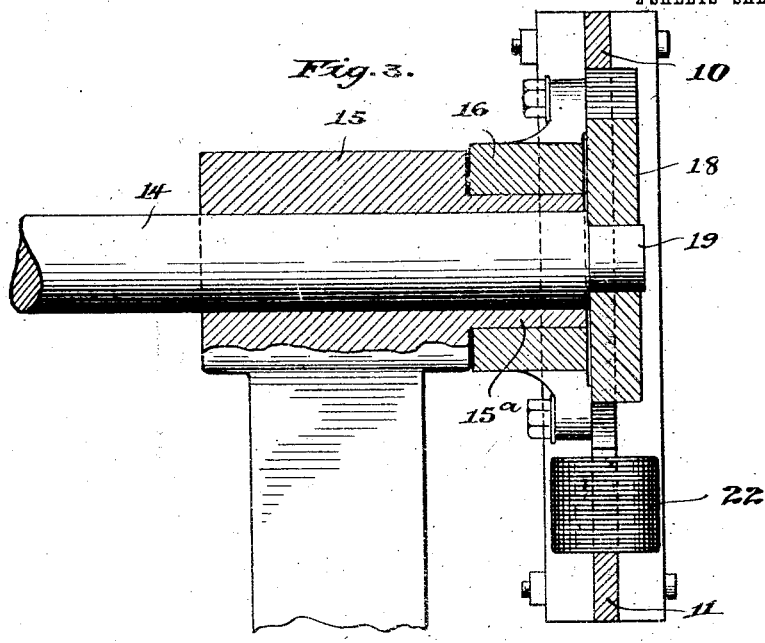

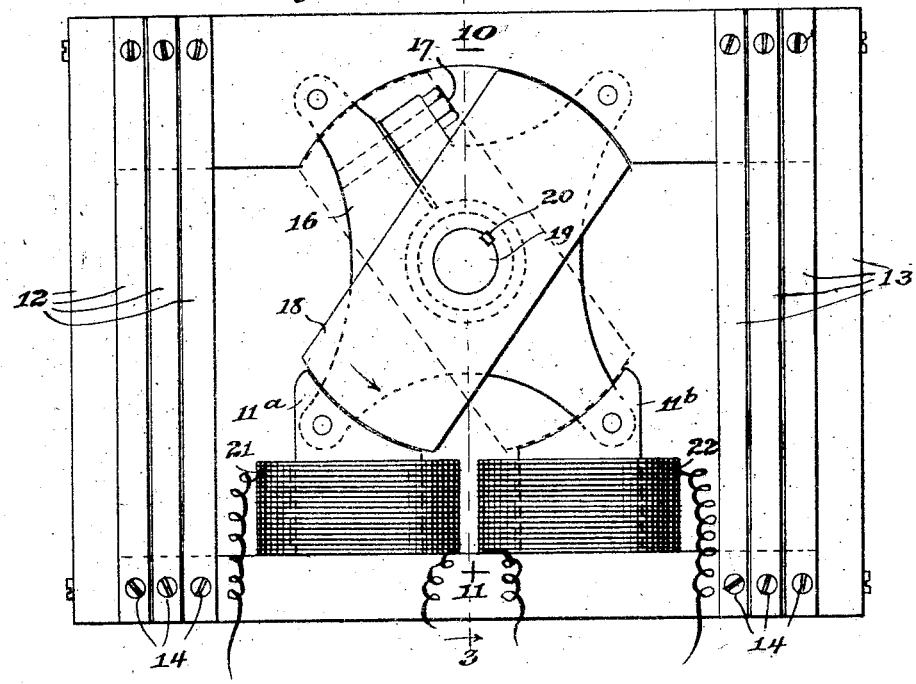
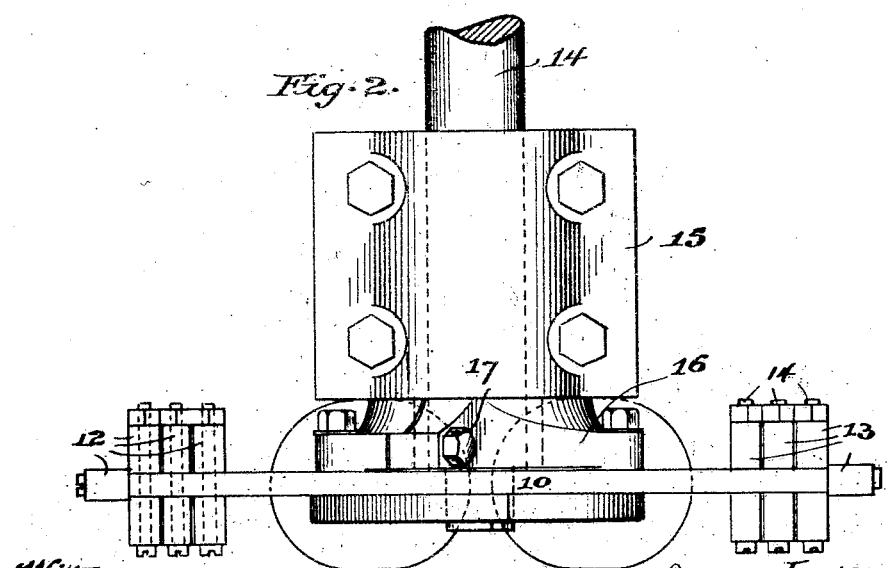

J. L. MILTON.
ELECTRIC GENERATOR.
APPLICATION FILED MAR. 22, 1906.

959,954.

Patented May 31, 1910.
2 SHEETS—SHEET 2.

Witnesses,
Inventor;
John L. Milton,
By Offield, Towle & Linthicum
Attys.

UNITED STATES PATENT OFFICE.

JOHN L. MILTON, OF CHICAGO, ILLINOIS, ASSIGNOR OF ONE-HALF TO TOWNER K. WEBSTER, OF CHICAGO, ILLINOIS.

ELECTRIC GENERATOR.

959,954.  Specification of Letters Patent.  Patented May 31, 1910.

Application filed March 22, 1906. Serial No. 307,391.

*To all whom it may concern:*

Be it known that I, JOHN L. MILTON, a citizen of the United States, residing at Chicago, in the county of Cook and State of Illinois, have invented certain new and useful Improvements in Electric Generators, of which the following is a specification.

My invention relates to improvements in so-called electric generators, or mechanical means and apparatus for producing electric current, more particularly to generators of the alternating type; my invention being especially well adapted in its use for the production of sparks for charge-ignition purposes in rapid combustion and explosive engines, and the like.

The general and leading object of my invention is to increase the operating and the productive efficiency of machines of this character and at the same time to simplify the construction and operation of such machines.

In the drawings I have illustrated practical embodiments of my invention in which,—

Figure 4:
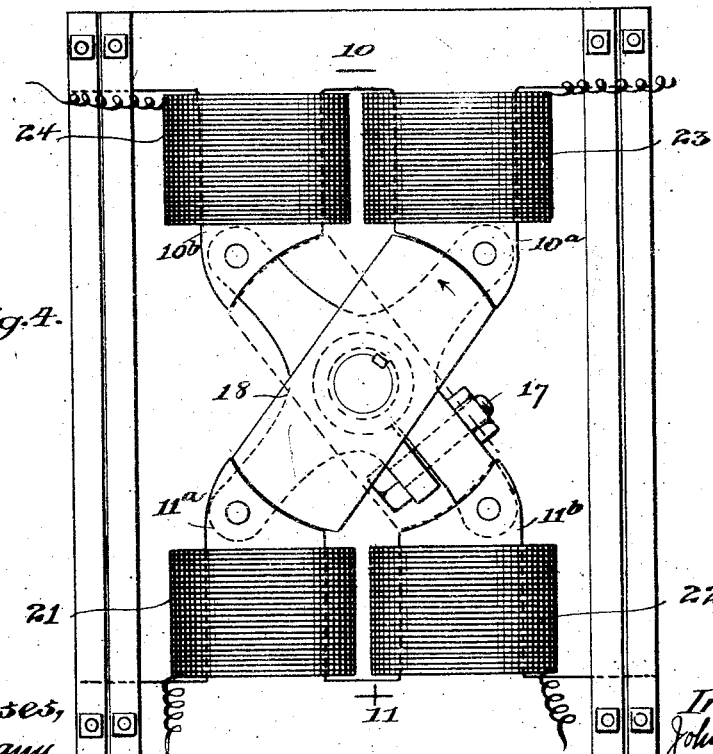

Figure 1 is an elevation of one form of device, in which only one magnet pole is provided with polar projections; Fig. 2 is a top plan view of the same; Fig. 3 is a section taken on the median line 3—3 of Fig. 1; Fig. 4 is an elevational view, similar to Fig. 1, of a modification.

In all of the views the same numerals and letters of reference indicate similar parts.

For the purpose stated the invention may take the form of a magneto-electric generator, although the invention is applicable to any type of dynamo-electric machine.

In the embodiments illustrated, 10 is preferably a soft iron pole-piece, and when connected to the magnets it is of a given polarity, and 11 is a similar pole-piece and when so connected is of the opposite polarity. In Fig. 1 the latter is shown provided with two polar projections $11^a$ and $11^b$. The consequent pole-pieces 10 and 11 are joined and held in proper relation by permanent magnets 12 and 13, a convenient or suitable number being placed upon either side of the respective pole-pieces 10 and 11, for which large contact surfaces are exposed for that purpose. The magnets are straight, requiring very little labor in the process of manufacturing, and, being so, they may be firmly fixed to the poles by means of bolts 14, without being subjected thereby to unnatural strain, which, as is well known, tends to demagnetize hard, so-called permanent magnets. The ends of the magnets 12 and 13 of like polarity are fixed in contact with one pole-piece, the other ends being attached to the other pole-piece. This arrangement is indicated in the drawings, the bottom pole-piece 11 being marked positive or +, and the upper pole-piece 10 being marked negative, or —. The polar projections are indicated by corresponding numerals with exponents "a" and "b."

A shaft 14, which may represent, for instance, the driven shaft of an explosive engine, is properly supported upon a bearing 15. A spider 16, having a split bearing, is mounted on a projection $15^a$ of the fixed bearing 15 (Fig. 3), said spider being angularly adjustable on its support by means of the bolt 17 (Figs. 1 and 2), said spider being secured at the ends of its four arms to the pole-pieces or their projections, whereby the magnetic field may be adjusted angularly with reference to the engine shaft to vary the relative time and range of the sparking period, as more particularly hereinafter described. An inductor or armature 18, shown in full lines, and also in dotted lines, in Figs. 1 and 2, is fixed to the shaft by any convenient means, a boss 19 and key 20 being shown for this purpose.

In Fig. 1 the armature 18 is shown in full lines as substantially closing the magnetic circuit between pole-piece 10 and polar projection $11^a$. In Fig. 4 the magnetic circuit is shown as substantially closed thereby through polar projections $10^a$ and $11^a$. When the armature is moved to dotted line position the magnetic circuit will be closed thereby through pole-piece 10 and polar projection $11^b$ or projection $10^b$ and projection $11^b$, as the case may be.

In Fig. 1, conducting coils 21 and 22 are placed around projections $11^a$ and $11^b$, respectively, or otherwise in inductive relation thereto; and, in Fig. 4 similar coils 23 and 24 occupy like positions with reference to the polar projections $10^a$ and $10^b$. The coils 21 and 23 may be connected in such a way that the electrical impulses produced therein may be mutually reciprocal, and the coils 22 and 24 may be connected in an independent circuit in such a manner as to produce similar results. It is highly desirable if not practically essential, for the proper operation of the device, that the pole-pieces 10 and 11, their respective polar projections and the inductor 18, be composed of highly permeable, magnetically susceptible material, such as the best quality of soft wrought-iron which interposes the smallest possible reluctance to the magnetic flux, and which is capable of losing substantially all of its magnetic effect when uninfluenced directly by a magnetically polarized body, such for instance, as one or more permanent magnets, electro-magnets, or the like. The inductor 18 should approach as closely to the surfaces of the respective poles, or polar projections, as mechanical conditions will permit, to reduce the magnetic reluctance through the inductor 18 to the minimum, so as to increase the magnetic flux therethrough to the maximum.

The operation of the device is as follows: When the inductor 18 is rotated in the direction shown by the arrows, as it approaches the position indicated in full lines, an impulse of electricity, in a given direction, will be induced in coils 21 and 23, and when the inductor leaves said coils and approaches the dotted line position, another impulse, but in the opposite direction, will be induced in said coils. Before the second impulse in coils 21 and 23 has died away, an impulse will be set up in coils 22 and 24 in the same direction as the first impulse in coils 21 and 23, and then a second impulse in said latter coils, in an opposite direction will succeed the first.

The inductive effect, by which the electric impulses are produced in the coils of insulated wire, is determined in a measure by the extent to which the magnetic density in the polar projections may be varied, and to some degree by the celerity with which the changes are accomplished. If the polar projections could be magnetically saturated within a given time and then immediately discharged to zero, the induced electric impulses described would reach the maximum effect. In other words, the greatest electromotive force capable of being evolved with a given winding is dependent upon the magneto-motive forces of the magnet.

When the inductor occupies a substantially horizontal position in the cycle of rotation, there will be a natural magnetic stress or strain existing between the pole 10 (Fig. 1) or its projections 10ª and 10ᵇ (Fig. 4), and the projections 11ª and 11ᵇ at which time a certain number of magnetic lines of force will pass through said polar projections on account of the effort of the magnet to short-circuit or close its poles through the intervening polar air space. Now, when the inductor arrives in the position shown in full lines in Figs. 1 and 4, the magnet will be substantially short-circuited by the armature through polar projection 11ª and the consequent pole 10 or polar projection 10ª. At this time there will practically be no magnetic lines of force passing through polar projection 11ᵇ, the same having been directed through projection 11ª and the path of much lower reluctance provided by the proximity of the inductor 18. Owing to the practically complete short-circuiting of the magnet, as described, the magnetic density of the projection 11ᵇ (Fig. 1) or projections 11ᵇ and 10ᵇ (Fig. 4) will sink practically to zero. Now, when the armature 18 reaches dotted line position, the entire number of magnetic lines of force will switch around through polar projection 11ᵇ, the inductor 18 and the pole 10 or polar projection 10ᵇ; then the magnetic density of the polar projections 11ª and 10ª will sink to practically zero. By this means the greatest variation of the density of magnetic lines of force is accomplished, and the highest possible inductive effect is attained. If the armature 18 be bodily reciprocated to approach or be brought into contact with first one polar projection and then the other, instead of being rotated, or oscillated, practically the same effect will be accomplished.

The angular adjustability of the field with reference to the rotating inductor provides a means whereby the time of generating the electrical impulse may be advanced or varied with reference to the position of the piston, so that the time of ignition may be correspondingly varied. The generator affords a wide range of sparking period, so that the latter is not confined to a mere critical point in the revolution, as in many generators of this general character.

For the foregoing reason, and because of the simplicity of the apparatus and the fact that it has no wearing parts, it is especially adapted for use on explosive and rapid combustion engines.

I have found in practice that a machine built substantially in accordance with Fig. 1, but with only one coil, such as coil 22, produces an electric current impulse sufficient for the purpose hereinbefore described when the armature is moved at a comparatively low rate of speed.

I do not wish to be understood as limiting my invention to the specific forms and constructional features shown, as it is obvious that many changes therein may be made without departing from the spirit and scope thereof.

I claim:

1. In an indicator-alternator for ignition purposes, the combination of two oppositely disposed groups of permanent straight-bar magnets, the magnets of each group being substantially parallel to each other, pole-pieces in engagement with the ends of like polarity of said magnets and forming therewith a substantially rectangular frame, one of said pole-pieces having a pair of inwardly turned polar projections, said magnets and pole-pieces lying in a single plane, a winding arranged in inductive relation to one of said polar projections, and an unwound inductor rotatable between said polar projections and the pole-piece opposite thereto, the width of said inductor being less than the shortest distance between said pole-pieces but greater than the distance between the adjacent sides of said polar projections, whereby at certain intervals the inductor opens the magnetic path of the field and at other intervals establishes two substantially parallel paths through said pole-pieces, an increase in reluctance in one of said paths being accompanied by a decrease in reluctance in the other path to produce graduated variations of magnetic flux through said winding during said last mentioned intervals.

2. In an inductor-alternator, the combination of a suitable support, a magnetic field-structure provided with inwardly turned polar projections, a winding on said field-structure, an unwound inductor movable within said field-structure in close proximity to said polar projections to vary the magnetic flux through said winding, an adjustable member mounted on said support, and a connection between said polar projections and adjustable member, whereby the field-structure may be radially adjusted.

3. In an inductor-alternator for ignition purposes, the combination of a field-magnet structure comprising a pair of magnets having like poles joined by pole-pieces provided with inwardly turned polar projections, a supporting member of non-magnetic material connected to the inner ends of said polar projections to support the field-structure, a bearing for supporting said non-magnetic member, windings in inductive relation to said polar projections, and an unwound inductor rotatable between said polar projections to vary the magnetic flux through said windings.

4. In an inductor-alternator for ignition purposes, the combination of two parallel groups of permanent magnets, pole pieces in engagement with the ends of like polarity of said magnets, inwardly turned polar projections on said pole pieces, a bearing plate of non-magnetic material connected at either side to the adjacent pole piece and having a centrally disposed bearing with its axis at right angles to the plane of said pole pieces, a shaft rotatable in said bearing, an inductor carried by said shaft and rotatable between said pole pieces to vary the distribution of the magnetic flux through diametrically opposite polar projections, and windings in inductive relation to said pole pieces.

5. In an inductor-alternator for ignition purposes, the combination of a pair of permanent straight-bar magnets arranged substantially parallel to each other, pole-pieces arranged between and in engagement with the ends of like polarity of said magnets and forming therewith a substantially rectangular frame, one of said pole-pieces having a pair of inwardly turned polar projections, an unwound inductor movable in said frame between said pole-pieces, and a winding in inductive relation to one of said polar projections.

6. In an inductor-alternator for ignition purposes, the combination of two groups of permanent straight-bar magnets, the magnets of each group being arranged substantially parallel to each other, pole-pieces arranged between and in engagement with the ends of like polarity of said magnets and forming therewith a substantially rectangular frame, one of said pole-pieces having a pair of inwardly turned polar projections, an unwound inductor rotatable within said frame between said polar projections and the pole-piece opposite thereto, and a winding arranged in inductive relation to one of said polar projections.

7. In an inductor-alternator for ignition purposes, the combination of two parallel groups of permanent straight-bar magnets, pole-pieces arranged between and in engagement with the ends of like polarity of said magnets and provided each with a plurality of inwardly turned polar projections, a bearing plate of non-magnetic material connected at either side to the adjacent pole-piece and having a centrally disposed bearing with its axis at right angles to the plane containing said pole-pieces, a shaft rotatable in said bearing, an inductor carried by said shaft and arranged to move in the magnetic field between said pole-pieces to vary the distribution of the magnetic flux through diametrically opposite polar projections, and windings in inductive relation to said pole-pieces.

8. In an inductor-alternator for ignition purposes, the combination of a field-magnet frame comprising a pair of permanent magnets, pole-pieces for connecting poles of like polarity of said magnets and provided with inwardly turned polar projections, a supporting piece of non-magnetic material connected to the inner ends of said polar projections, windings in inductive relation to said polar projections, and an unwound inductor rotatable between the polar projections on the opposite pole-pieces.

9. In an inductor-alternator for ignition purposes, the combination of a field-magnet frame comprising a pair of permanent magnets, pole-pieces for connecting poles of like polarity of said magnets and provided with inwardly turned polar projections, a supporting and connecting piece of non-magnetic material fixed to the inner ends of said polar projections, a shaft extending through said connecting piece, said connecting piece being adjustable on said shaft, an unwound inductor carried by the shaft and rotatable between the polar projections on the opposite pole-pieces, and windings in inductive relation to said polar projections.

JOHN L. MILTON.

Witnesses:
SAMUEL N. POND,
FREDERICK C. GOODWIN.